United States Patent [19]

Beasley et al.

[11] Patent Number: 5,206,837
[45] Date of Patent: Apr. 27, 1993

[54] METHOD FOR COMPENSATING FOR THE EFFECT OF IRREGULAR SPATIAL SAMPLING OF SEISMIC WAVEFIELDS

[75] Inventors: Craig J. Beasley, Houston, Tex.; Rolf Klotz, Singapore, Singapore

[73] Assignee: Western Atlas International, Inc., Houston, Tex.

[21] Appl. No.: 890,924

[22] Filed: May 29, 1992

[51] Int. Cl.$^5$ .................................................. G01V 1/36
[52] U.S. Cl. ............................................ 367/38; 367/59
[58] Field of Search ................................ 367/38, 50, 59

[56] References Cited

U.S. PATENT DOCUMENTS 4,742,497  5/1988  Beasley et al. ........................ 367/52

OTHER PUBLICATIONS

Ronen, J. M., "Multichannel Inversion in Reflection Seismology" PHD Thesis, 1986, Stanford University, Sep. 1986.

Ronen, J. Wave Equation Trace Interpolation, Geophysics v. 52, n.7., Jul. 1987, pp. 973-984.

Black, J. L. and Schleicher, K. Effect of Irregular Sampling on Prestack DMO Expanded Abstract No. 1144, SEG Int.'l Mtg., 1989, pp. 1144-1147.

Williams, R. G. and Marcouux, Michael O. Model Constrained Anti-Alias Filtering for Improved 3D DMO (B-20), EAEG Meeting, May 1989.

Primary Examiner—Ian J. Lobo
Attorney, Agent, or Firm—William A. Knox

[57] ABSTRACT

This invention provides a method for compensating for the deleterious effects of irregular spatial sampling of seismic data. The imbalance caused by sparse sampling is corrected by decomposing a processed data gather into its constituent dip and azimuth components, analyzing the movement and scaling of selected attributes of those components and applying an inverse sampling operator to the processed data based upon the analytical results.

7 Claims, 2 Drawing Sheets

METHOD FOR COMPENSATING FOR THE EFFECT OF IRREGULAR SPATIAL SAMPLING OF SEISMIC WAVEFIELDS

BACKGROUND OF THE INVENTION

1. Field of the Invention

This invention relates generally to seismic data processing and more particularly to a method for compensating for the effects of irregular spatial data sampling of seismic wavefields.

2. Discussion of the Prior Art

In the art of seismic exploration, an acoustic wavefield (a shot) is generated by an acoustic source. The wavefield propagates through the earth from a source location. The wavefield is reflected from earth layers beneath the surface whence it returns to the surface. A plurality of seismic detectors are distributed on or near the surface of the earth, remotely from the source location, along lines of survey or in large areal patches. Preferably, the detectors, which constitute discrete wavefield sampling stations, are uniformly distributed spatially so that the wavefield can be uniformly sampled both areally and temporally. The sampled data are quantized and archivally recorded for further processing.

From a practical standpoint, the ideal uniform distribution is sometimes not possible because of obstructions such as buildings, roads or other culture. In the case of marine exploration, the distribution is irregular because of errors in the assumed detector locations due to cable drift because of currents and wind or due to the presence of drilling and production platforms. The seismic data are often not only locally under-sampled, they also may be locally excessively densely sampled.

Well-known seismic data-processing algorithms such as stacking, multi-channel filtering, dip moveout correction (DMO), prestack migration, velocity analyses, anisotropy studies, migration and wavefield extrapolation, all assume that the data are uniformly sampled. However, in operation, the data gathered may be irregularly sampled. That irregularity may be due to obstructions as earlier explained or to missing shots or to inoperative detectors or receivers. When such irregular or inadequately spatially sampled data are not corrected, unwanted computational artifacts may result that are superimposed upon the processed output data. Wave-equation processing routines such as DMO and movement of data samples, such as by repositioning because of dip migration, can be affected by irregular spatial sampling. In fact, the algorithm meant to improve the output data actually degrades that data because spatial under-sampling or over-sampling leaves remanents of the data-processing operators in the output data. Gross under-sampling, of course may result in dip aliasing. Noise, which is offset-dependent, is only partly canceled out in the stacking operation in the presence of locally-sparse spatial sampling.

In this disclosure, the term "operator" will be used frequently. The term is defined to mean a specific thing involved in a data-processing operation. Thus a DMO operator is a specific expression involved in applying a correction to normal moveout for dip. An operator may be expressed as a symbol indicating an operation to be performed and itself may be the subject of mathematical manipulation.

Various authorities have addressed the problem of locally-sparse spatial wavefield sampling. In a paper entitled *Wave-equation Trace Interpolation*, (Geophysics, vol. 52, no. 7, July 1987, pp 973-984) J. Ronen discloses that a processing sequence in which one treats missing data as zero data and performs partial migration before stacking is equivalent to application of the transpose of the stacking operator that actually needs to be inverted. Ronen states that the inverse of the operator cannot be uniquely determined but it can be estimated using spatial spectral balancing in a conjugate-gradient iterative scheme. The first iteration is simply prestack partial migration. Where spatial aliasing is present, several additional iterations are needed.

R. G. Williams et al, in a paper delivered at the 51st annual meeting of the EAEG, May 1989, entitled *Model-constrained Anti-alias Filtering for Improved DMO*, apply an anti-alias filter to the data so that the azimuthal under-sampling of the DMO operator can be reduced by use of a dip model for the survey to limit the operator aperture in an azimuth-dependent manner.

In a paper published as expanded abstract no. 1144, at the 59th International Meeting of the SEG, 1989, entitled *Effect of Irregular Sampling on Prestack DMO*, J. Black et al. explain that irregular midpoint and azimuthal distributions of the seismic data will cause artifacts in the DMO output if those irregular distributions are ignored. That is said to be especially a problem for pre-stack DMO with land data-collection geometries. Using the actual data-collection geometry, the DMO response can be computed for flat events and can be used to design long wavelength corrections and selective edits that minimize the impact of DMO-induced artifacts. This procedure can be used with any DMO implementation but it is especially relevant for 3-D DMO using the Kirchhoff method.

Although the above references have addressed specific facets of the problems of locally sparse or irregular spatial sampling, there yet remains a need for a comprehensive, accurate and efficient solution to the problem that is computationally economical.

SUMMARY OF THE INVENTION

In accordance with this invention, a method is proposed, based on the decomposition of a seismic-wavefield gather into its constituent dip and source-detector offset components, that accounts for the effect of irregular spatial data sampling by applying an inverse sampling operator to the gather. The method can be applied to any 2-D or 3-D DMO algorithm in a multi-channel wavefield-gathering operation.

A wavefield is propagated from a source location. The wavefield is spatially sampled at a plurality of discrete data-sampling stations that are distributed over an area that is remote from the source location. The wavefield samples are combined into a raw gather to which a selected processing operator is applied in a processing step to provide a processed gather. An inverse sampling operator is then applied to the processed gather to provide an equalized wavefield gather.

The inverse sampling operator includes the steps of decomposing the processed gather into constituent dip components. The movement and scaling of selected attributes of the components, resulting from the processing step, are analyzed. The movement and scaling of those components are corrected for undesired processing artifacts due to locally, relatively sparse, or relatively dense spatial sampling.

In an aspect of this invention, the processing operator may be a form of DMO.

BRIEF DESCRIPTION OF THE DRAWINGS

The novel features which are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention.

DETAILED DESCRIPTION OF THE PREFERRED EMBODIMENT

Figure 1:
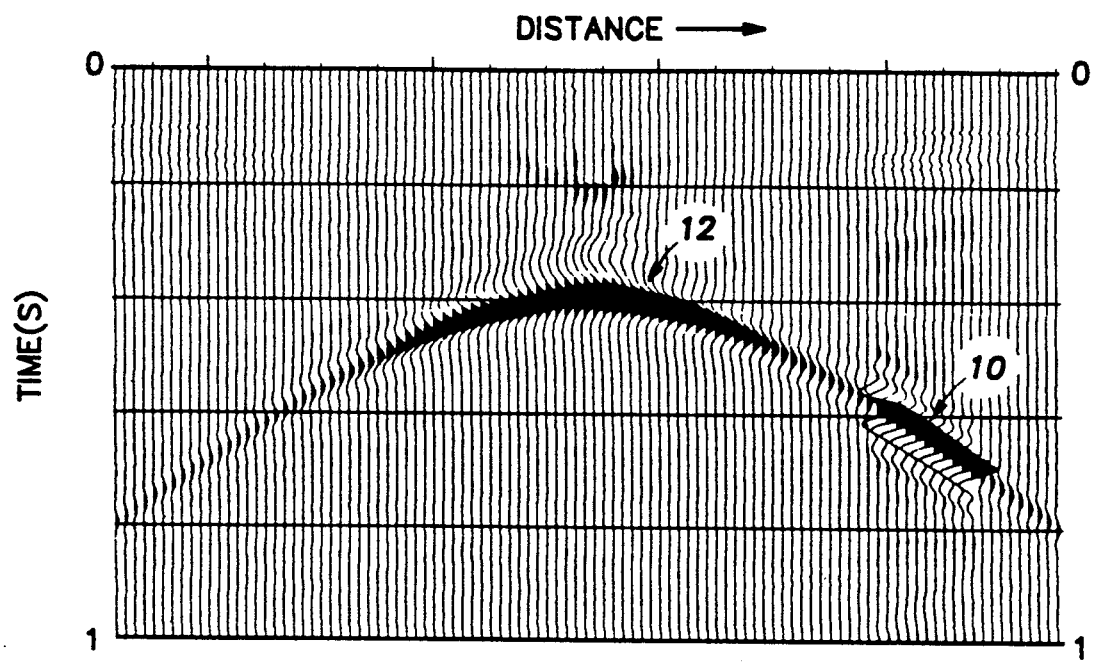
FIG. 1 shows the effect of locally-sparse, irregularly-sampled wavefield of a point-diffractor model.

For the purpose of clarity and explanation, the method of this invention will be described by way of example, but not by way of limitation, with respect to DMO processing of seismic wavefields. It is to be clearly understood that the preferred method may be applied to any multichannel data processing regime such as anisotropy studies, filtering operators, migration and wavefield extrapolation as earlier mentioned.

Repeated reference has been and will be made to Dip Moveout correction or DMO. The DMO operator can be decomposed into two simple processes: A dip-dependent normal moveout correction followed by a dip filter. The full DMO operator is formed by summing the results over all possible dips. See for example, U.S. Pat. No. 4,742,497, issued May 3, 1988, to Craig Beasley et al. At each output station and time, the DMO-corrected wavefield then decomposes into a sum of dip components contributed from the input data. Applying DMO to regularly-sampled data will create at each spatial location a complete and balanced distribution of dip components, which interfere constructively or destructively to form the DMO-corrected wavefield. On the other hand, irregularly sampled data results, after DMO, in a lack of dip components at some spatial and temporal locations or an over-abundance of dip components at other spatial and temporal locations. That imbalance in the dip components that form the DMO-corrected wavefield hinders the process of constructive and destructive interference. A solution to this problem lies in analyzing the imbalances and normalizing to correct said problem.

In this process, there is first tabulated for each output time, azimuth, location and dip, the number of traces that have contributed to that dip component. Then, just as a stack is normalized by dividing the summed data by a function of the time-and mid-point-varying multiplicity, each dip component is individually normalized by applying the inverse of the number of live dip contributions from the input wavefield samples. In effect that process is a type of scaling of a selected attribute, such as amplitude, of the dip components. Assuming a constant source-location to sampling-station azimuth, the preferred method can be formalized by the following analysis which can be easily extended to the case of varying azimuth by adding a summation over azimuth.

For uniformly sampled data, the zero-offset wavefield $P_o$ obtained from applying DMO and stack can be represented as $$P_o = \frac{1}{n} \sum_{h=1}^{n} D_h P \qquad (1)$$

where P is the normal-moveout corrected pre-stack data uniformly sampled within each offset, h is an index denoting offset and the $D_h$ are the familiar common-offset DMO operators. In this notation, $D_h$ operates on the entire input wavefield but is zero except for data within the offset group h. With this notation, we can drop the input and output wavefields and write the combined DMO and stack operator S as $$S = \frac{1}{n} \sum_{h=1}^{n} D_h \qquad (2)$$

For seismic data with irregular sampling, traces within offset groups are either missing or perhaps replicated. The configuration of the sampling stations forms a de facto acquisition filter that acts on the sampled wavefield in a manner analogous to the filtering effect of the earth. We can represent that effect as a sampling operator $A_h$ that is applied prior to DMO, to the regularly sampled data. The DMO and stack operator actually applied is then given by $$\widetilde{S} = \frac{1}{n} \sum_{h=1}^{n} D_h A_h \qquad (3)$$

Now we write the DMO operator in equation (3) in discrete form as the sum of its dip components:

$$\widetilde{S} = \frac{1}{n} \sum_{h=1}^{n} \sum_d F_d N_{d,h} A_h \qquad (4)$$

where $N_{d,h}$ is a dip-dependent normal moveout correction and $F_d$ is a dip filter that passes a range of dips surrounding dip d. By reversing the order of summation and factoring out the dip filter, (4) can be written as $$\widetilde{S} = \frac{1}{n} \sum_d F_d \left( \sum_{h=1}^{n} N_{d,h} A_h \right) \qquad (5)$$

To correct for the sampling effects introduced by the operator $A_h$, we introduce the dip-dependent operator $H_d$ into the process and obtain $$S = \frac{1}{n} \sum_d D_d H_d \left( \sum_{h=1}^{n} N_{d,h} A_h \right) \qquad (6)$$

where $$H_d = \left( \sum_{h=1}^{n} N_{d,h} \right) \left( \sum_{h=1}^{n} N_{d,h} A_h \right)^{-1} \qquad (7)$$

Equation 7 defines an inverse sampling operator that forms the basis of the DMO equalization operator. When $A_h$ is the identity function, the process is simply conventional DMO that would be applied in the presence of uniform spatial sampling. As long as the inverse operator given by (7) exists, the DMO equalization process applied to irregularly sampled data is theoretically equivalent to conventional DMO applied to uniformly-sampled data. In effect, the inverse operator provides a means for performing an informed splining of phantom components between operators across a sparsely-sampled data gap by borrowing properly-sampled adjacent dip segments. In Equation (7), the splining operation is performed across the h axis, that is, the source to receiver offset but could also be performed across other spatial and temporal axes. It is of course possible that the data are so sparsely sampled that some dip components are missing entirely and thus cannot be equalized without unduly creative assumptions.

FIG. 1 shows the effect of missing data on conventional DMO and stacking of 20-fold synthetic data derived from a constant-velocity point-diffractor model. The large amplitudes at 10 on the right limb of the hyperbola 12 are the result of a sudden drop of the multiplicity from 20-fold to 6-fold. More subtle amplitude and phase distortions near the apex are caused by deletion of 20 shots in the neighborhood of the apex location.

Figure 2:
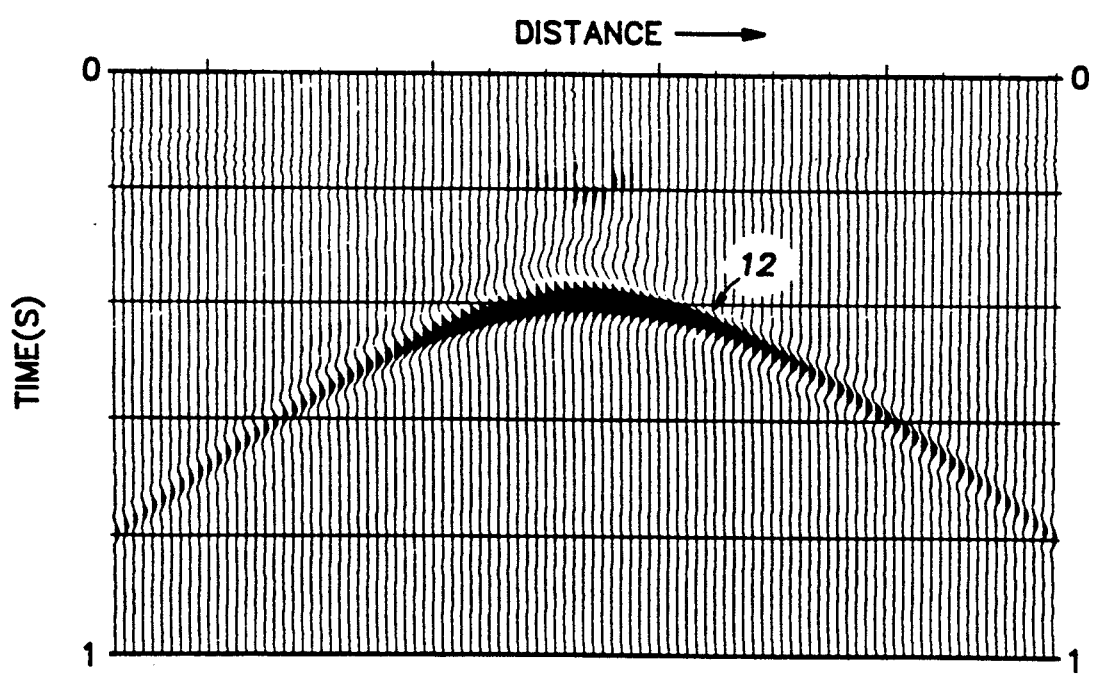
FIG. 2 is the result after the application of the method of the present invention to the irregularly-sampled data of FIG. 1, after DMO equalization.

The hyperbola 12 of FIG. 2 shows the result of applying DMO equalization to the same data as used in FIG. 1. The artifacts due to irregular sampling mostly have been removed.

A description of the best mode of operation of this invention is necessarily entwined with the mathematical formulations as above outlined. Because of the myriads of calculations required for the seismic data-reduction processes, this method is preferably computer-implemented according to the flow diagram illustrated in FIG. 3 which is specific, by way of example only, to DMO processing.

Figure 3:
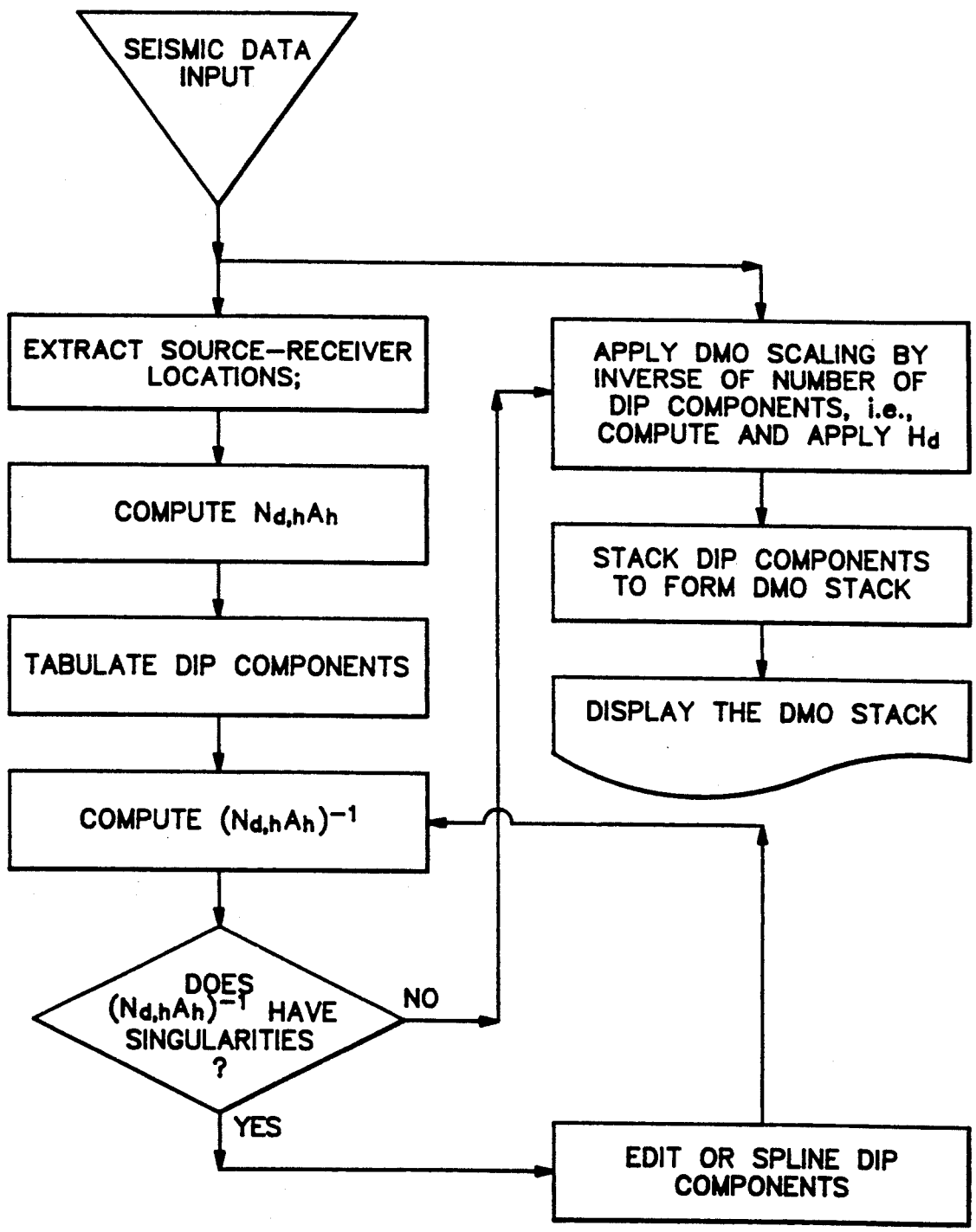
FIG. 3 is a flow diagram illustrative of a computer implementation of the method of this invention when used in applying a DMO operator to the data.

FIG. 3 shows the application of the method of the present invention to a data-processing operator such as DMO. In FIG. 3, the raw seismic wavefield input samples are gathered and the source-receiver locations and are identified with respect to the respective wavefield samples to determine source-to-receiver offsets. Normal moveout as a function of dip and offset is applied and a dip-dependent sampling operator is computed. The number of constituent dip components is tabulated. A sampling operator is computed and examined for singularities, that is, for null values due to locally inadequate spatial sampling. So long as the sampling operator is non-zero or above a predetermined threshold value, the inverse is applied to the gathered input data followed by application of a processing operator which may be a selected DMO operator. The processed gather is scaled and equalized by division by the number of live tabulated dip components. A stacking operator is applied to provide a display of the DMO stack. If the sampling operator is singular or below the predetermined threshold, due to regions of locally sparse or missing spatial wavefield samples, phantom dip components are splined into the processed gather to simulate the effect of spatially-uniform sampling. Alternatively, phantom wavefield samples may be splined into the raw seismic wavefield input. In the event of an excess of spatial samples, the excess dip components are edited out.

This invention has been described with particular application to DMO processing by way of example but not by way of limitation. The concepts developed herein can apply to any multichannel wavefield gathering or processing method such as to more exotic DMO operators designed to handle velocity analyses, anisotropy, filtering and other processes dealing with migration and wavefield extrapolation. This invention is in no way restricted to any specific type DMO algorithm and is limited only by the appended claims.

What is claimed is:

1. A method for processing seismic wavefields propagated from a source location, comprising:
   spatially sampling said wavefield at a preselected plurality of discrete sampling stations distributed over an area remotely from said source location;
   combining the wavefield samples into a raw wavefield input gather;
   applying a selected processing operator to said raw wavefield input gather to provide a processed gather;
   applying an inverse sampling operator to said processed gather, the inverse sampling operator including the steps of:
   (a) decomposing the processed gather into constituent dip components;
   (b) tabulating the number of live dip components;
   (c) scaling selected attributes of said constituent dip components by dividing the constituent dip components by the number of live dip components to provide equalized dip components; and
   (d) correcting said equalized dip components to suppress undesired processing artifacts resulting from locally relatively sparse and locally relatively dense spatial sampling.

2. The method as defined by claim 1, comprising:
   applying a selected DMO operator as said processing operator.

3. The method as defined by claim 1, wherein:
   the step of correcting includes the step of simulating uniform spatial wavefield sampling in regions of locally-sparse spatial wavefield sampling by splining phantom components into the processed gather to simulate the effect of spatially uniform wavefield sampling.

4. The method as defined by claim 1, wherein:
   the step of correcting includes the step of simulating uniform spatial wavefield sampling in regions of locally-dense wavefield sampling by rejecting excess components from the processed gather.

5. A method for compensating for the effect of irregular spatial sampling intervals in a multichannel seismic survey, comprising:
   propagating a seismic wavefield from a source location;
   spatially sampling said wavefield at a preselected plurality of discrete sampling stations distributed over an area remotely from said source location;
   combining the wavefield samples in a raw wavefield gather;
   computing a sampling operator;
   applying an inverse sampling operator to said raw wavefield gather to produce an equalized wavefield gather;
   applying a selected processing operator to said equalized wavefield gather to provide a processed gather; and
   displaying said processed gather.

6. The method as defined by claim 5, wherein:
   said processing operator is a selected DMO operator.

7. The method as defined by claim 5, comprising:
   analyzing said sampling operator for singularities; and
   in local regions where said sampling operator exhibits null values, splining phantom wavefield samples into said raw wavefield gather to simulate uniform sampling.

* * * * *